(No Model.)  6 Sheets—Sheet 1.

J. S. KEMP.
FERTILIZER DISTRIBUTER.

No. 425,512. Patented Apr. 15, 1890.

Witnesses  
N. P. Denison  
P. P. Denison

Joseph S. Kemp Inventor  
By his Attorneys  
Smith & Denison (No Model.)  6 Sheets—Sheet 2.

J. S. KEMP.
FERTILIZER DISTRIBUTER.

No. 425,512.  Patented Apr. 15, 1890.

Witnesses  
H. P. Denison.  
F. P. Denison.

Joseph S. Kemp  Inventor  
By his Attorneys  
Smith & Denison (No Model.)  6 Sheets—Sheet 3.

J. S. KEMP.
FERTILIZER DISTRIBUTER.

No. 425,512.  Patented Apr. 15, 1890.

Witnesses  
N. P. Denslow  
F. P. Denison

Joseph S. Kemp  Inventor  
By his Attorneys  
Smith & Denison

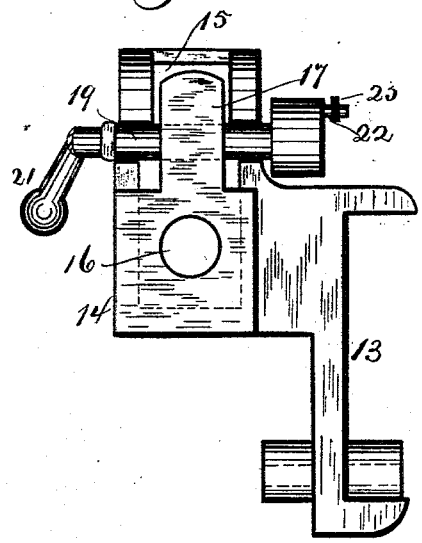
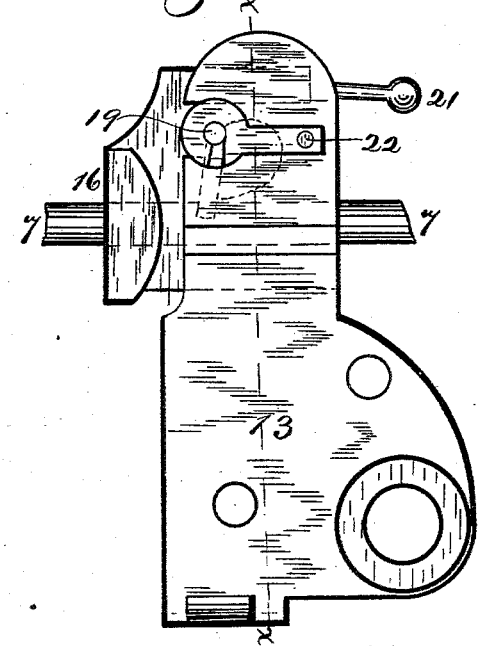
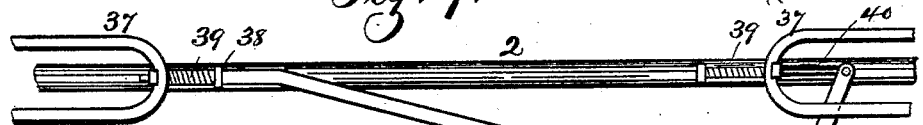
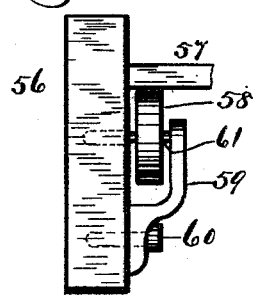
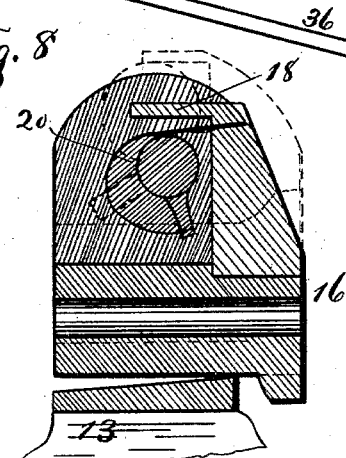
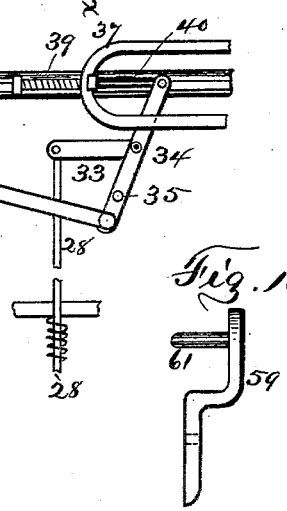

(No Model.) 6 Sheets—Sheet 5.
J. S. KEMP.
FERTILIZER DISTRIBUTER.
No. 425,512. Patented Apr. 15, 1890.
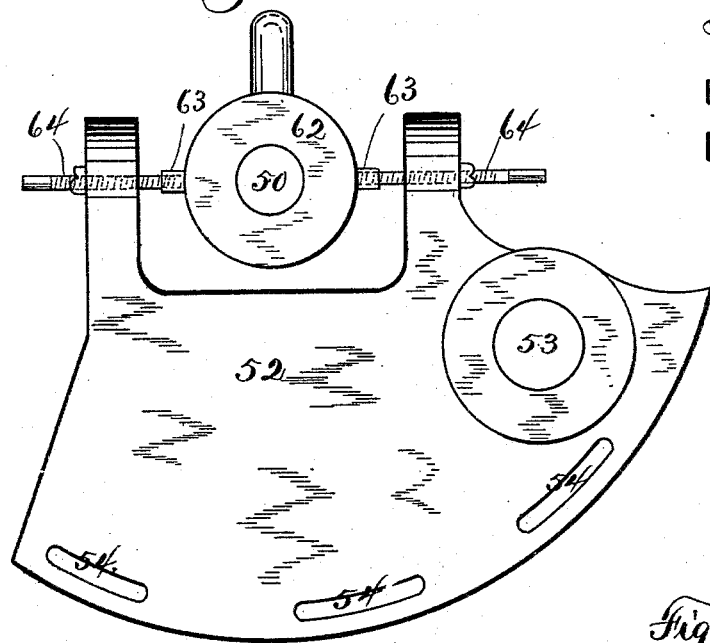
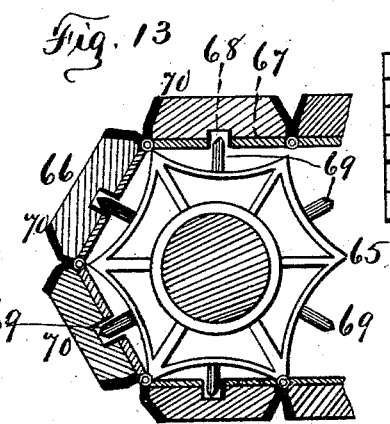
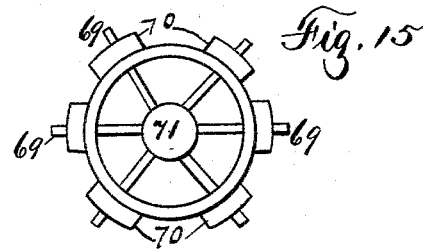
Witnesses
H. P. Denison
P. P. Denison
Joseph S. Kemp  Inventor
By his Attorneys
Smith & Denison
THE NORRIS PETERS CO., PHOTO-LITHO., WASHINGTON, D. C.

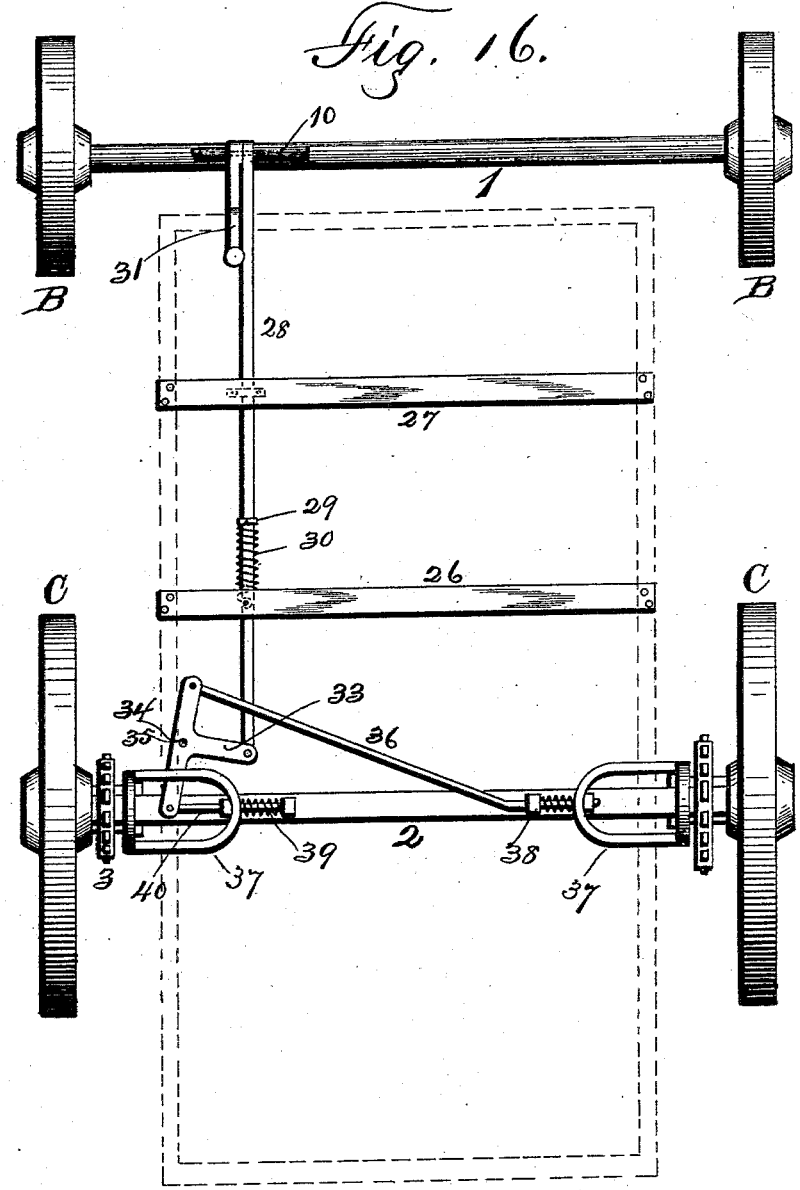

UNITED STATES PATENT OFFICE.

JOSEPH S. KEMP, OF SYRACUSE, NEW YORK.

FERTILIZER-DISTRIBUTER.

SPECIFICATION forming part of Letters Patent No. 425,512, dated April 15, 1890.

Application filed July 15, 1889. Serial No. 317,647. (No model.)

*To all whom it may concern:*

Be it known that I, JOSEPH S. KEMP, of Syracuse, in the county of Onondaga, in the State of New York, have invented new and useful Improvements in Fertilizer-Distributers, of which the following, taken in connection with the accompanying drawings, is a full, clear, and exact description.

Figure 1:
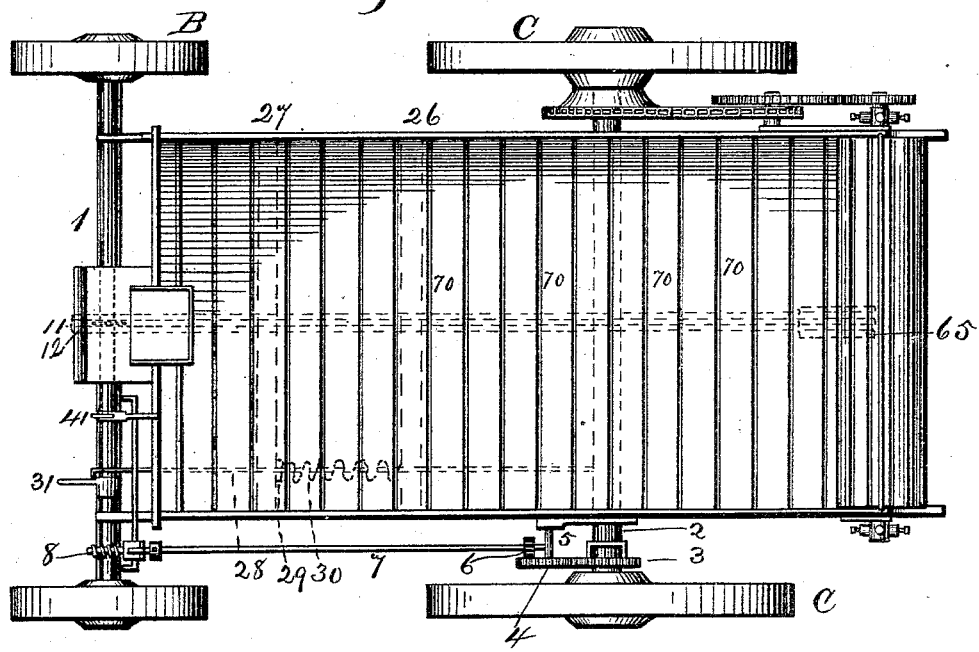
Figure 2:
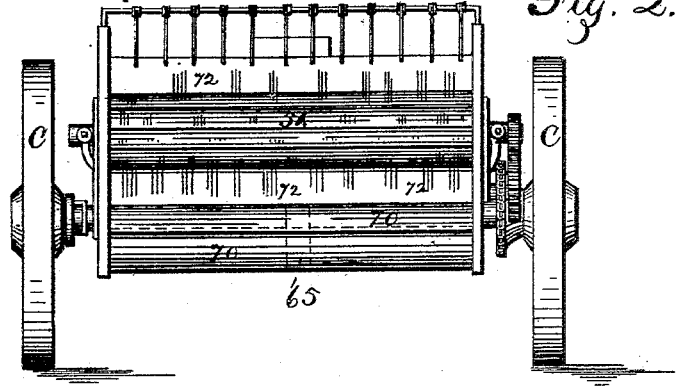
Figure 3:
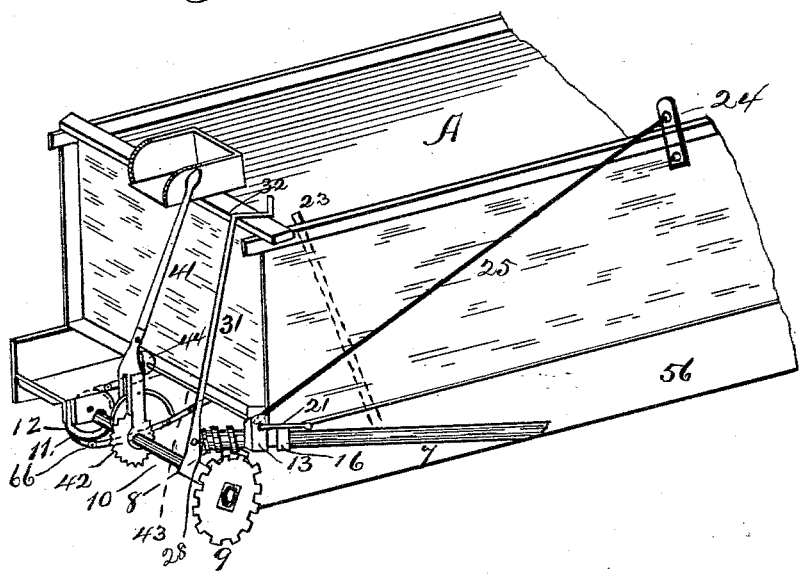
Figure 4:
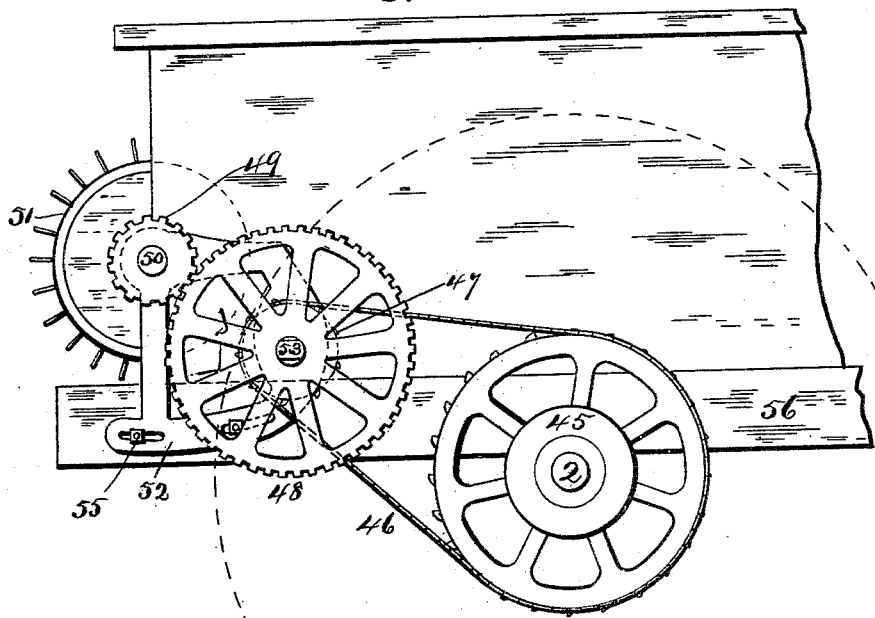

Figure 1 is a top plan view. Fig. 2 is a rear elevation of the machine. Fig. 3 is an isometrical elevation of the front end. Fig. 4 is a side elevation of the rear end, showing the beater-driving mechanism. Fig. 5 is a rear elevation of the shifter for throwing the apron in and out of gear. Fig. 6 is a side elevation of the same. Fig. 7 is a plan view of the mechanism for operating the clutches engaging with the wheels. Fig. 8 is a vertical section of Fig. 6 on the line $x$ $x$. Fig. 9 is a detail showing a side elevation of an idler carrying a part of the apron. Fig. 10 is a plan of the hanger supporting the idler shown in Fig. 9. Fig. 11 is a plan of the adjustable frame carrying the beater and operating as a belt-tightener. Fig. 12 is a plan view of a link of the apron-chain. Fig. 13 is a sectional elevation showing a part of the apron and chain around the idler carrying the apron at the rear and engaging with the chain. Fig. 14 is a plan of the beater flattened out to show the arrangement of the teeth thereon in groups and steps. Fig. 15 is a plan view of another idler operating the same as in Fig. 13. Fig. 16 is a plan view with the box removed.

This invention relates to the construction and operation of fertilizer-distributers using a movable bottom.

My object is to improve their construction in the points hereinafter specified, thereby increasing their utility without appreciably increasing the cost.

My invention consists, first, in a novel mechanism for simultaneously operating the clutches engaging with the drive-wheels to throw the machine in or out of gear; second, in the novel mechanism for operating the apron; third, in the automatic feed-stopping mechanism; fourth, in the novel bracket and holder carrying the idlers upon which the apron is supported; fifth, in the novel mechanism for keeping taut the main driving-belt, and also in the other novel features of construction and operation hereinafter set forth, and which are specifically set forth in the several clauses of claim hereunto annexed.

It is constructed as follows:

A is the box.

B B are the front wheels.

C C are the rear wheels.

1 is the front axle, and 2 is the rear axle.

Upon the rear axle I mount the gear 3, adapted to rotate with the axle and meshing with the gear 4, mounted upon an arbor 5, projecting from the side of the box or sill, and 6 is a pinion meshing with the gear 4 and mounted upon the shaft 7, the front end of which is provided with worm 8, which engages with the gear 9, which gear is mounted on the shaft 10, which is mounted transversely across between the sills of the box at the front end thereof, and 11 is a sprocket-gear upon this shaft, over which the chain 12 runs, which chain is connected at its ends to the front and rear end of the apron or movable bottom, so that when the gear 4 rotates the power is transmitted to and rotates the sprocket 11, and this pulls upon the chain and draws the apron or movable bottom backward.

To throw this mechanism out of gear by disengaging the worm 8 from the gear 9, I use the following mechanism: A bracket 13 is secured upon the outer face of the sill, and it is provided with an outer arm 14, slotted vertically, as at 15 and as shown by the dotted lines, Fig. 5, and in this slot I mount a bearing-block 16, which is the bearing for the shaft 7, and this block is provided upon its upper side with an arm 17, which arm is provided with a flange 18. 19 is a shaft mounted in the walls of the slotway 15 and provided with a cam 20, which stands between the walls aforesaid, and which shaft is provided at one end with a handle 21 and at its other end with a crank 22, and so arranged that when the handle 21 is thrown over backward the cam will engage with the flange of the bearing-block 16 and will raise the whole bearing-block in the slotway, carrying with it the shaft 7 and the worm 8 and raising the worm out of engagement. To do this automatically I place a stud 23 upon the top of the head-board of the apron, (shown in dotted lines in Fig. 3,) and upon the outside of the box I pivot the bar 24 and arrange it in such manner that the stud 23 will encounter this bar 24 when the apron has moved backward a certain distance, and throwing the bar 24 over backward will pull upon the rod 25, connected at one end to the bar and at the other end to the crank 22, and this strain will rotate the shaft 19 and raise the worm out of gear. The dotted lines, Fig. 8, show the lift of this shaft-bearing when the worm is raised out of gear, and this stops the rotation of the gear 9, shaft 10, and sprocket 11, and the movement of the apron or bottom.

Between the side sills and below the movable bottom I mount the cross-pieces 26 and 27, notched to receive the rod 28, as shown in dotted lines in Fig. 1, and upon this rod I mount a collar 29, and 30 is a spring coiled around the rod and having its rear end abutting against the cross-bar 26 and its front end against the collar 29, and the front end of this rod is connected to the lever 31, and 32 is a spring-catch mounted upon the front of the body and holding the lever back. The opposite end of this rod 28 is connected to the arm 33 of the crank-lever 34, pivotally mounted upon the bottom of one of the frame-timbers of the body at 35, the front end of this lever being pivotally connected to the draw-rod 36, the other end of which is connected to the clutch 37, which is only partly shown here, it being the subject-matter of a patent granted to me dated June 18, 1889, No. 405,561, the part shown being a part of the yoke connected to the pawls. This rod 36 passes through a guide 38, and 39 is a spring around it between the clutch-yoke and the guide. The other end of the lever 34 is pivotally connected to a rod 40, which is connected to the yoke 37 on that side, and within the yoke a spring 39 is coiled about it, and these springs 39 operate to throw the clutches outward and to throw the pawls into engagement. When these pawls are in engagement—that is, when the different parts, yokes, rods, and lever 34 are in the position shown in the drawings—then the handle 31 is in the position shown in Fig. 3, the upper part being caught in or under the catch 32, and the spring 30 is then compressed, so that when I desire to stop the movement of the movable apron I release the lever 31 from the catch 32, and the spring 30 will throw that lever over, pulling the rod 28 forward and drawing the clutches out of engagement with the rear wheels.

To throw the clutches into engagement, I draw the lever 31 back into engagement with the catch 32, compressing the spring 30 and throwing the rods, lever, and clutches into the position shown in the drawings, and the rod 28, operating in conjunction with the springs 39, first aiding in moving the parts into proper position for engagement, and then throwing the clutches into engagement and holding them yieldingly in such engagement.

To operate the apron by hand, I use a mechanism comprising a lever 41, provided with a yoke in its lower end, between the arms of which and secured upon the shaft 10 is a ratchet-wheel 42, the arms of the lever fitting loosely upon the same shaft and a pawl being provided, pivotally mounted in the lever and engaging with the ratchet. This ratchet mechanism is operated by the driver without leaving his seat, and when the worm 8 is out of gear and the apron in its normal position for loading the head-board should be within about three inches of the rear of the box in front, and to adapt the vehicle for unloading I throw the pawl into engagement with the ratchet by lifting the worm out of gear. This lifting of the worm operates a rod 43, rotating the lock 44 into the position shown in Fig. 3, and this lock, when reversed, bears against the rear arm of the pawl and holds it down, throwing the front point out of engagement with the ratchet. I then operate the lever and draw the load forward close to the front of the box, clearing the material from the beater, so that the beater will start more easily and better perform its functions. The rotation of the axle 2 imparts motion to the sprocket 45, mounted thereon, and through the chain 46 rotates the sprocket 47, which in turn gives motion to the gear 48, and this rotates the pinion 49, which is mounted upon the beater-arbor 50, and 51 is the beater.

To regulate the tension of the chain 46, I use a swing-frame 52, pivotally suspended from the beater-arbor 50 and projecting downward and forward therefrom and provided with a stud 53, which is the arbor upon which the sprocket 47 and gear 48 are mounted. It is also provided in its lower edge with two or more slots 54, concentric with the center of the beater-shaft, and through these slots I pass the bolts 55 into the sill of the main frame, so that by loosening them the frame can be swung upon the beater-arbor to the right to decrease the tension or to the left to increase it and to take up slack.

56 is a sill of the main frame of the body.

57 is a slat of the removable bottom or apron.

58 is an idler-pulley, one of the series on each side supporting the ends of the apron-slats and the edges of the apron, and 59 is a bracket for holding said idler, which bracket consists of a body provided with a hole to receive the bolt 60, which secures the lower end to the sill, and above this bolt is an offset, in which is secured the pin or journal 61, upon which the pulley 58 is mounted loosely, this pin being long enough to pass through the idler-pulley and into the body of the sill, as shown in dotted lines, Fig. 9. As shown in the drawings, this bracket and the idler-pin are all cast in one piece, and in this construction I obtain a double support for the idler against the strain of the weight of the load upon the apron.

I have said that the swing-frame 52 was pivotally mounted or suspended from the beater-arbor. It is suspended as follows, viz: I place upon the arbor adjacent to its outer end a loose collar 62, provided on its opposite sides with bosses 63, which are hollow or concaved to receive the points of the suspension-bolts 64, which bolts carry the beater at that end and which can be adjusted relatively to each other to insure the perfect alignment of the beater, the beater-arbor rotating in the sleeve 62.

65 is the idler at the rear of the machine, over which the chain 66 passes, the sprocket 11 carrying the front of the chain. This chain is composed of links 67, consisting of a flat body with a central hole 68 and having upon its ends means for coupling the links together. The idler 65 is shown as hexagonal in general form, the sides being concaved, and centrally to each side I erect a stud 69, which enters the hole 68 in the chain-links and any cavity necessary in the slats 70 of the apron or movable bottom, and these studs hold the apron from any side motion toward or against the sides of the box, forcing it to travel in a direct line. The space between the points of the idler is equal to the length of one of the links as well as the width of the slats, so that the bottom will properly conform to the idler.

71, Fig. 15, is another form of idler having six studs 69, mounted in six convex blocks 70 upon its periphery, which blocks support the slats, the hinges of the chain coming between these blocks.

To illustrate my method of arranging the teeth of the beater, I show, Fig. 14, the six slats thereof laid down edge to edge as a plane surface, the dots 72 indicating the teeth, and it will be seen that they are arranged in diagonal groups the lines of which meet centrally, and each group being adapted to follow the group two slats ahead of it, so that when the beater is rotated this arrangement of the teeth operates to throw the material outward from the center toward the sides, thus insuring an even distribution and also insuring a more perfect disintegration, and at the same time reducing the liability of crowding and clogging to the minimum.

What I claim is—

1. The combination, with the worm-gear directly connected to and rotated by the axle, of the shifter consisting of a bracket having an arm which is slotted vertically, a bearing-block receiving the shaft of a worm-gear and fitting in said slotway and provided with an arm upon its upper end having a flange, a shaft journaled in the bracket-arm, a cam upon the shaft engaging with the bearing-block to hold the worm in gear, and with the flange upon the bearing-block arm to raise it out of gear, as set forth.

2. The combination, with the worm-gear directly connected to and rotated by the axle and the apron-shaft rotated by the worm, of the shifter consisting of a bracket having a vertically-slotted arm receiving the bearing-block, a bearing-block receiving the worm-shaft and provided with a vertical arm having a flange, a shaft journaled in the bracket-arm, and a cam upon said shaft engaging with the bearing-block to hold the worm in gear, and with the flange upon the arm thereof to raise the worm out of gear, as set forth.

3. The combination, with the clutch mechanism engaging with the rear wheels, of the clutch-shifter consisting of a lever at the front end of the box, a draw-rod connected at one end to the lever and at the other end to the arm of a crank, a crank provided with two other arms, each of which is connected by suitable rods to the clutch mechanism, and suitable springs upon the clutch-rods and upon the draw-rod, substantially as described.

4. The combination, with the bottom and sill, of an idler supporting the bottom and mounted upon a bracket comprising a body, a pin secured to the body and carrying the idler, and means for securing the foot of the bracket to the sill, substantially as described.

5. The combination, with the driving-sprocket upon the main axle and the driving-belt, of a swing-frame suspended from the beater-shaft and provided with a stud upon its front end upon which the gear driving the beater-pinion is mounted, substantially as described.

6. The combination, with the driving-sprocket upon the axle and the driving-belt, of a swing-frame suspended from the beater-shaft and provided with a stud on its outer face carrying the gear driving the beater-pinion, and with slotways concentric with the beater-arbor, and a sleeve-box upon the beater-arbor, and adjusting-screws through the upper end of the frame engaging with the sleeve and carrying that end of the beater, substantially as described.

7. The combination, with the worm 8, its shaft, the box-sleeve upon the shaft, the cam-lever to elevate the worm out of gear, and the crank 22 upon the lever-shaft, of the stud 23 upon the apron head-board, the arm 24, pivotally mounted upon the side of the body, and the rod 25, connecting it to the crank 22, substantially as described.

8. The combination, with the movable bottom and the open-link chain secured upon the under side of the slats and hinged together, of a polygonal idler having concaved sides and pins projecting centrally from the concaved sides and adapted to engage with the chain-links.

In witness whereof I have hereunto set my hand this 13th day of July, 1889.

JOSEPH S. KEMP.

In presence of—
 H. P. DENISON,
 W. H. MARTELL.